US011221761B2

United States Patent
Cheong et al.

(10) Patent No.: US 11,221,761 B2
(45) Date of Patent: Jan. 11, 2022

(54) ELECTRONIC DEVICE FOR CONTROLLING OPERATION BY USING DISPLAY COMPRISING RESTRICTION AREA, AND OPERATION METHOD THEREFOR

(71) Applicant: SAMSUNG ELECTRONICS CO., LTD., Suwon-si (KR)

(72) Inventors: Sucheol Cheong, Suwon-si (KR); Donghyun Yeom, Suwon-si (KR); Hangil Song, Suwon-si (KR); Seungmin Choi, Suwon-si (KR); Myunggon Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/962,703

(22) PCT Filed: Jan. 18, 2019

(86) PCT No.: PCT/KR2019/000774
§ 371 (c)(1),
(2) Date: Jul. 16, 2020

(87) PCT Pub. No.: WO2019/143188
PCT Pub. Date: Jul. 25, 2019

(65) Prior Publication Data
US 2020/0356267 A1    Nov. 12, 2020

(30) Foreign Application Priority Data
Jan. 18, 2018    (KR) .................. 10-2018-0006794

(51) Int. Cl.
*G06F 3/0488*    (2013.01)
*G06F 3/041*    (2006.01)
(Continued)

(52) U.S. Cl.
CPC ........ *G06F 3/04886* (2013.01); *G06F 3/0416* (2013.01); *G06F 3/04845* (2013.01);
(Continued)

(58) Field of Classification Search
CPC .... G06F 3/0486; G06F 3/04886; G06F 3/041; G06F 3/0416; G06F 3/04845;
(Continued)

(56) References Cited

U.S. PATENT DOCUMENTS

2010/0123664 A1 * 5/2010 Shin ................ G06F 3/0488
345/169
2010/0255885 A1    10/2010 Lee
(Continued)

FOREIGN PATENT DOCUMENTS

KR    10-2010-0111351    10/2010
KR    20120000630 A *   1/2012
(Continued)

OTHER PUBLICATIONS

International Search Report for PCT/KR2019/000774, dated Apr. 25, 2019, 4 pages.
(Continued)

*Primary Examiner* — Reza Nabi
*Assistant Examiner* — Hwei-Min Lu
(74) *Attorney, Agent, or Firm* — Nixon & Vanderhye, P.C.

(57) ABSTRACT

An example electronic device includes a memory for storing data related to an application; a display comprising a first area in which a first sensor of a first method is disposed, and a second area in which a second sensor of the first method and a third sensor of a second method are disposed; and a processor. The processor is configured to display on the display an object related to the application via the first area, detect a first input for the object, while the first sensor and
(Continued)

the second sensor are activated, deactivate the first sensor and the second sensor at least on the basis of the first input, execute a specified function related to the application on the basis of a second input inputted according to the second method via the second area, while the third sensor is activated.

15 Claims, 16 Drawing Sheets

(51) Int. Cl.
*G06F 3/0484* (2013.01)
*H04N 5/225* (2006.01)

(52) U.S. Cl.
CPC .............. *G06F 2203/04105* (2013.01); *G06F 2203/04803* (2013.01); *H04N 5/2257* (2013.01)

(58) Field of Classification Search
CPC ............ G06F 2203/04105; G06F 2203/04803; H04N 5/2257; H04N 5/225
USPC .......................................................... 715/769
See application file for complete search history.

(56) References Cited

U.S. PATENT DOCUMENTS

| | | | |
|---|---|---|---|
| 2013/0083491 A1 | 4/2013 | Rappoport et al. | |
| 2013/0100030 A1* | 4/2013 | Los | G06F 3/0443 345/169 |
| 2013/0265243 A1* | 10/2013 | Law | G06F 1/3262 345/173 |
| 2013/0328051 A1 | 12/2013 | Franklin et al. | |
| 2014/0285450 A1* | 9/2014 | Cho | G06F 1/1641 345/173 |
| 2014/0351744 A1 | 11/2014 | Jeon et al. | |
| 2015/0079963 A1* | 3/2015 | Sun | H04W 4/60 455/418 |
| 2015/0192989 A1 | 7/2015 | Kim et al. | |
| 2015/0339028 A1* | 11/2015 | Chen | G06F 3/0488 715/863 |
| 2015/0346899 A1* | 12/2015 | Jung | G06F 3/1423 345/173 |
| 2016/0026381 A1* | 1/2016 | Kim | G06F 3/04886 715/761 |
| 2016/0041683 A1* | 2/2016 | Ma | G06F 3/04886 345/173 |
| 2016/0062515 A1* | 3/2016 | Bae | G06F 3/0418 345/174 |
| 2016/0080542 A1 | 3/2016 | Park et al. | |
| 2016/0378334 A1* | 12/2016 | Liu | G06F 1/1686 715/794 |
| 2017/0026553 A1 | 1/2017 | Lee et al. | |
| 2017/0052628 A1 | 2/2017 | Yi et al. | |
| 2018/0081517 A1* | 3/2018 | Luo | G06F 3/0486 |
| 2018/0088722 A1 | 3/2018 | Kim et al. | |
| 2018/0224990 A1* | 8/2018 | Shim | G06F 3/0484 |
| 2018/0232092 A1* | 8/2018 | Lee | G06F 3/0412 |
| 2018/0373408 A1* | 12/2018 | Lee | G06F 1/165 |
| 2020/0310627 A1* | 10/2020 | Ning | G06F 9/451 |

FOREIGN PATENT DOCUMENTS

| | | |
|---|---|---|
| KR | 10-2014-0137509 | 12/2014 |
| KR | 10-2015-0082032 | 7/2015 |
| KR | 10-2016-0032565 | 3/2016 |
| KR | 10-2017-0021159 | 2/2017 |
| KR | 10-1748173 | 6/2017 |
| KR | 10-1816549 | 1/2018 |

OTHER PUBLICATIONS

Written Opinion of the ISA for PCT/KR2019/000774, dated Apr. 25, 2019, 7 pages.

* cited by examiner

ELECTRONIC DEVICE FOR CONTROLLING OPERATION BY USING DISPLAY COMPRISING RESTRICTION AREA, AND OPERATION METHOD THEREFOR

CROSS-REFERENCE TO RELATED APPLICATION(S)

This application is a National Phase Entry of PCT international Application No. PCT/KR2019/000774, which was filed on Jan. 18, 2019, and claims priority to Korean Patent Application No. 10-2018-0006794 filed on Jan. 18, 2018, in the Korean Intellectual Property Office, the contents of which are incorporated herein by reference.

BACKGROUND

1. Field

Various embodiments of the disclosure relate to an electronic device including a display and a method of operating the same. The disclosure is to use a display area protruding from a display having a restricted area.

2. Description of the Related Art

A display may be mounted on the front surface of an electronic device, and the display may display a user interface of an application to be provided to the user. In addition, an electronic device may provide various functions by receiving a user input through a touch screen disposed together with the display.

Recently, in order to secure an area to mount a front camera on an electronic device when it is desired to mount a display on the front surface of the electronic device, a display having a structure in which a portion of a display panel is cut or includes an opening in some layers or an area of a display panel has been discussed.

SUMMARY

In electronic devices, an uncut protruding area in a display having a cut structure merely displays the state of an electronic device, and thus the utilization of the protruding area of the display is not high.

According to various embodiments of the disclosure, an electronic device is able to provide an interface for utilizing a protruding area, which is not physically nor visually cut.

An electronic device according to various embodiments of the disclosure may include: a memory configured to store data related to an application; a display including a first area and a second area; a first sensor of a first scheme disposed in the first area of the display; a second sensor of the first scheme disposed in the second area of the display; a third sensor of a second scheme; and a processor. The processor may be configured to: display an object related to the application via the first area; detect a first input for the object in the state in which the first sensor and the second sensor are activated; deactivate the first sensor and the second sensor while displaying the object in the second area at least based on the first input; and execute a designated function related to the application based on a second input, input by the second scheme via the second area in the state in which the third sensor is activated.

An electronic device according to various embodiments of the disclosure may include: a memory configured to store data related to an application; a display including a first area and a second area; a first sensor of a first scheme disposed in the first area and the second area; a second sensor of a second scheme disposed in the second area; and a processor. The processor may be configured to: display an object related to the application via the first area; identify a first input corresponding to the object in the state in which the first sensor is activated; deactivate the first sensor while displaying the object in the second area at least based on the first input; and execute a designated function related to the application based on a second input, input by the second scheme via the second area in the state in which the second sensor is activated.

An electronic device according to various embodiments of the disclosure may include: a memory configured to store an application; a display including a first area and a second area; a first sensor of a first scheme and a second sensor of a second scheme disposed in the first area, wherein the second area is disposed at one side of the first area; and a processor. The processor may be configured to: receive information related to a notification of an application; determine the size of a notification area in which the notification of the application is to be displayed at least based on the received information; and display the notification area in at least one of the first area or the second area of the display.

According to various embodiments of the disclosure, in a method of controlling an electronic device, which includes a display including a first area in which a first sensor of a first scheme is disposed, and a second area in which a second sensor of the first scheme and a third sensor of a second scheme are disposed, the method may include: an operation of displaying an object related to an application via the first area; an operation of detecting a first input for the object in the state in which the first sensor and the second sensor are activated; an operation of deactivating the first sensor and the second sensor while displaying the object in the second area at least based on the first input; and an operation of executing a designated function related to the application based on a second input, input by the second scheme via the second area in the state in which the third sensor is activated.

According to various embodiments of the disclosure, in a method of controlling an electronic device, which includes a display including a first area in which a first sensor of a first scheme is disposed, and a second area in which the first sensor and a second sensor of a second scheme are disposed, the method may include: an operation of displaying an object related to an application via the first area; an operation of identifying a first input corresponding to the object in the state in which the first sensor is activated; an operation of deactivating the first sensor at least based on the first input; and an operation of executing a designated function related to the application based on a second input, input by the second scheme via the second area in the state in which the second sensor is activated.

According to various embodiments, in a method of controlling an electronic device, which includes: a memory configured to store an application; a display including a first area in which a first sensor of a first scheme and a second sensor of a second scheme are disposed and a second area in which the first sensor and the second sensor are disposed and which is disposed at one side of the first area; and a processor, the method may include: an operation of receiving information related to a notification of an application; an operation of determining the size of a notification area in which the notification of the application is to be displayed at least based on the received information; and an operation of displaying the notification area in at least one of the first area or the second area of the display.

According to various embodiments of the disclosure, an electronic device can be controlled by separately providing an interface for a non-cut protruding area, which is convenient for a user in controlling a display including a restricted area (e.g., a cut area).

DETAILED DESCRIPTION

Figure 1:
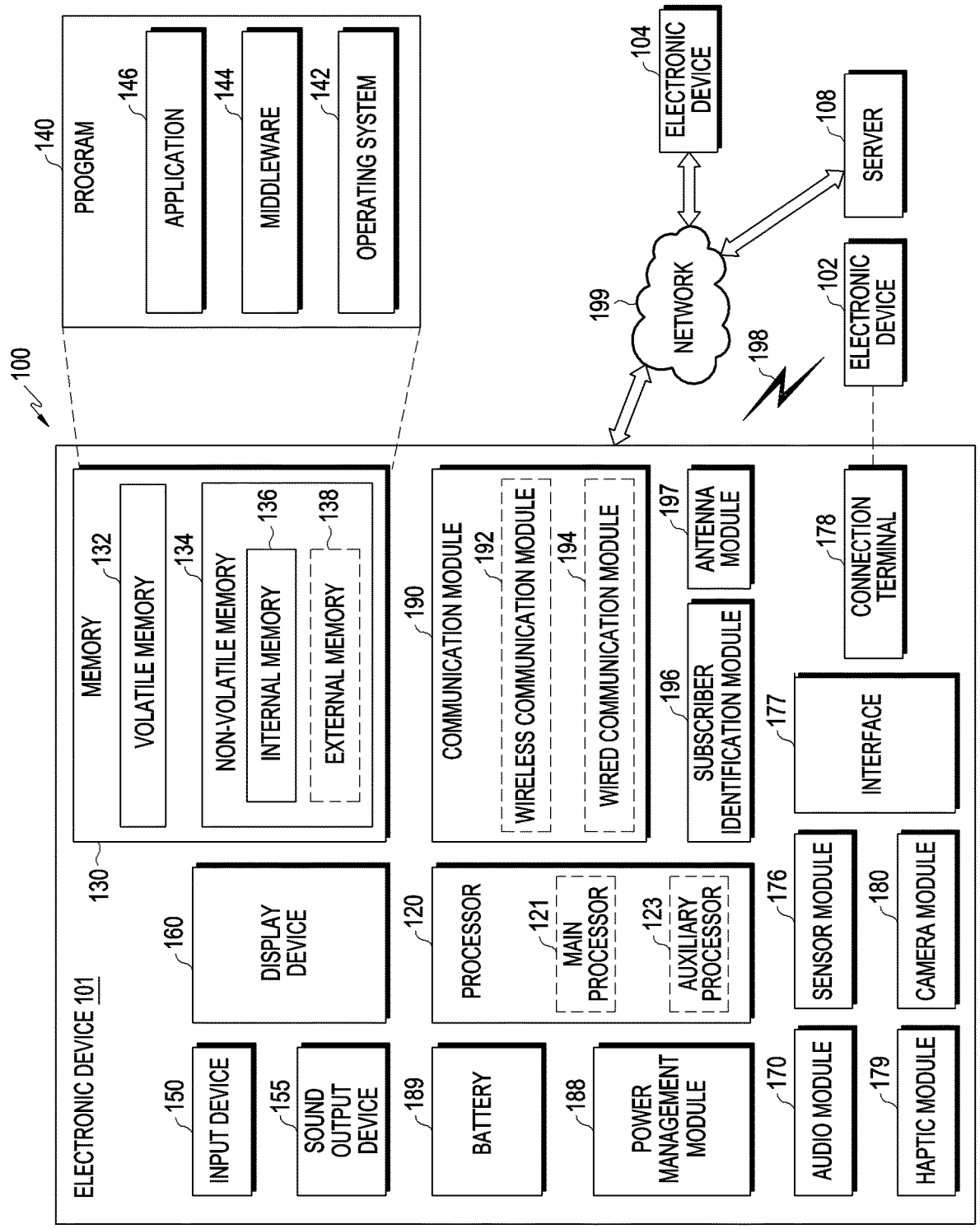
FIG. 1 illustrates a network environment including an electronic device for controlling an operation using a display including a restricted area, according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
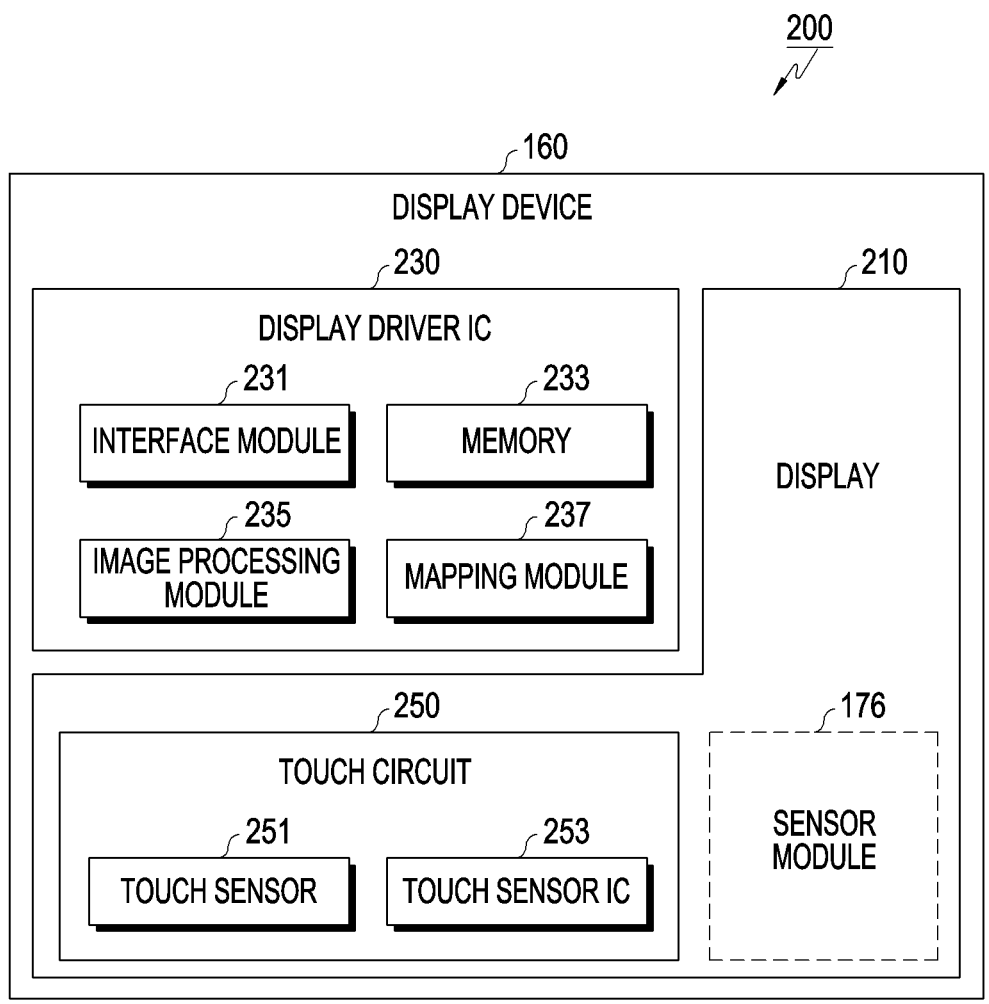
FIG. 2 is a block diagram of a display device for controlling an operation using a display including a restricted area according to various embodiments of the disclosure.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive, for example, image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate with touch circuitry 250 or the sensor module 176 via the interface module 231. The DDI 230 may also store at least part of the received image information in the memory 233, for example, on a frame by frame basis. The image processing module 235 may perform, for example, pre-processing or post-processing (e.g., adjustment of resolution, brightness, or size) with respect to at least part of the image data. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control, for example, the touch sensor 251 to sense a touch input or a hovering input with respect to a certain position on the display 210. To achieve this, for example, the touch sensor IC 253 may measure a change in a signal (e.g., a voltage, a quantity of light, a resistance, or a quantity of electric charges) corresponding to the certain position on the display 210 to detect a touch input or a hovering input. The touch sensor IC 253 may provide input information (e.g., a position, an area, a pressure, or a time) indicative of the detected touch input or the hovering input to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
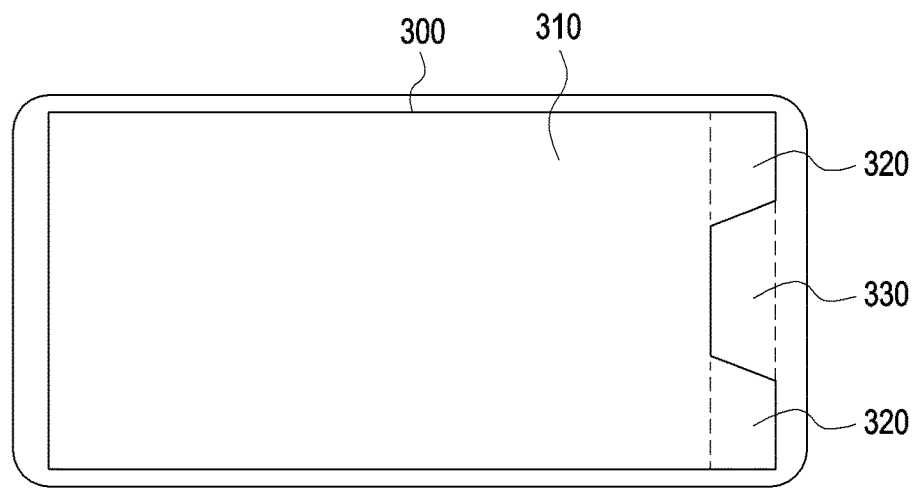
FIG. 3A is a view illustrating an exemplary display according to various embodiments.
Figure 3B:
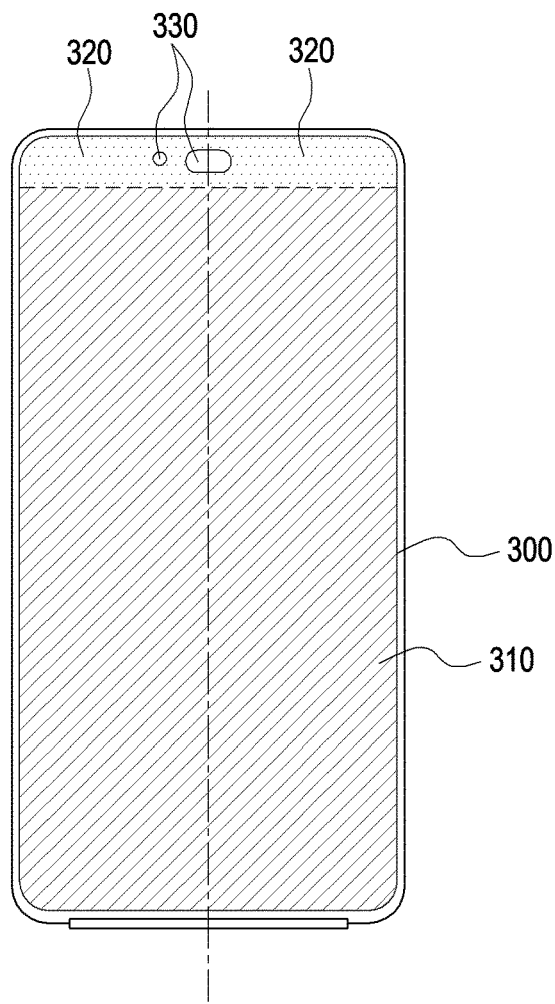
FIG. 3B is a view illustrating an exemplary display according to various embodiments.
Figure 3C:
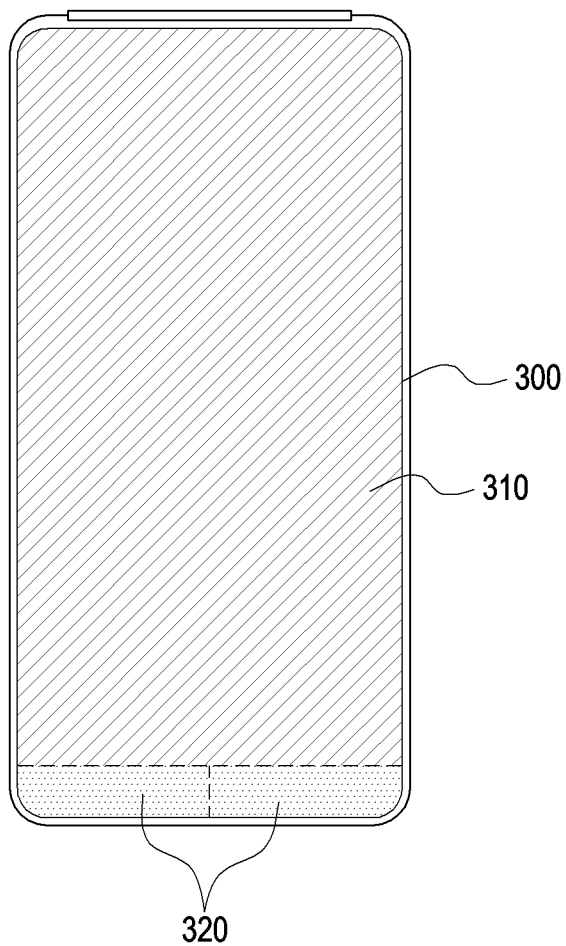
FIG. 3C is a view illustrating an exemplary display according to various embodiments.

FIG. 3A is a view illustrating an exemplary display according to various embodiments. FIG. 3B is a view illustrating an exemplary display according to various embodiments. FIG. 3C is a view illustrating an exemplary display according to various embodiments.

Referring to FIG. 3A, a display device (e.g., the display device 160 in FIG. 1) of an electronic device (e.g., the electronic device 101 in FIG. 1) according to various embodiments of the disclosure may include a display 300 (e.g., the display 210 in FIG. 2) including therein a first area 310 and a second area 320. A first sensor of a first scheme may be disposed in the first area 310 of the display 300, and a second sensor of the first scheme and a third sensor of a second scheme may be disposed in the second area 320. The display 300 may include a third area 330 separated from the first area 310 or the second area 320. According to various embodiments, when the display 300 is cut at least to correspond to the shape of the third area 330 and the third area 330 is used, the display 300 may provide designated functions (e.g., display or input reception) in a limited manner using the third area 330. According to various embodiments, the third region 330 may have a structure in which a small number of pixels are disposed compared to the first area 310 or the second area 320 (e.g., a low-resolution structure), and at least one sensor for receiving light may be disposed in the area 330.

According to various embodiments, the third area 330 may be referred to as a restricted area that is physically, visually, or functionally limited compared to the first area 310 or the second area 320. For example, the third area 330 may be an area that is distinct from the first area 310 or the second area 320 by the presence or absence of cutting (e.g., the third area 330 is a cut region). For example, the third area 330 may be an area that is distinct from the first area 310 or the second area 320 by a display property (for example, the third area 330 is a low-resolution area).

When the third area 330 is a cut area, the second area 320 may correspond to an uncut area. The third area 330 may be disposed at one side of the first area 310 and may have a structure that physically or visually protrudes from the one side of the first area 310. The first sensor and the second sensor may detect a user input in the same scheme, i.e. the first scheme, and the processor 120 may detect a user's touch input detected on the touch screen using the first sensor and the second sensor. The third sensor of the second scheme may detect a user's force input applied to the touch screen. The force input may be an input in which a pressure in a designated range is applied to the touch screen by a user. The third sensor of the second scheme is disposed in the second area 320 of the display 300. However, in another embodiment, the third sensor may also be disposed in the first area 310 of the display 300, and may detect a force input on a specific point or a gesture input (e.g., a drag input) detected in the state in which the force input is maintained. The display 300 may provide a display function to the second area 320 and a limited display function to the third area 330. According to various embodiments, at least one sensor (e.g., an image sensor or an illuminance sensor) for receiving light may be disposed in the third area 330.

Referring to FIG. 3B, a display device (e.g., the display device 160 in FIG. 1) of an electronic device (e.g., the electronic device 101 in FIG. 1) according to various embodiments of the disclosure may include a display 300 (e.g., the display 210 in FIG. 2) including therein a first area 310 and a second area 320. A first sensor of a first scheme may be disposed in the first area 310 of the display 300, and a second sensor of the first scheme and/or a third sensor of a second scheme may be disposed in the second area 320.

In the display 300 according to various embodiments, the third area 330 may be an area formed by cutting at least a portion of the display 300, and the third area 330 may have a structure in which fewer pixels are disposed compared to the first area 310 or the second area 320. When the third area 330 is an area formed by cutting at least a portion of the display 300, the third area 330 may provide a designated function to the display 300 in a limited manner. When the third area 330 has therein fewer pixels than the first area 310 or the second area 320, the third area 330 and the first area 310 (or the second area 320) may be different from each other in terms of light transmittance or resolution. For example, the resolution of the third area 330 may be lower than that of the first area 310 or the second area 320.

In FIG. 3B, the third area 330 is illustrated as being cut in a circular shape, but is not limited thereto, and the third area 330 may be cut in various shapes. The cut form or cut area of the third area 330 may be based on the type of at least one sensor (an image sensor, a face recognition sensor, an illuminance sensor, a 3D sensor, proximity sensor, or the like) to be placed in the second area 320 or the third area 330. According to an embodiment, the first sensor and the second sensor may detect a user input in the same scheme, i.e., the first scheme, and the processor 120 may detect, using the first sensor and the second sensor, a user input detected on the touch screen. The third sensor of the second scheme may detect a force input applied by the user on or over the touch screen. The force input may be an input in which a pressure in a designated range is applied to the touch screen by a user. The third sensor of the second scheme is disposed in the second area 320 of the display 300. However, in another embodiment, the third sensor may also be disposed in the first area 310 of the display 300, and may detect a force input on a specific point or a gesture input (e.g., a drag input) detected in the state in which the force input is maintained.

Referring to FIG. 3C, a display device (e.g., the display device 160 in FIG. 1) of an electronic device (e.g., the electronic device 101 in FIG. 1) according to various embodiments of the disclosure may include a display 300 (e.g., the display 210 in FIG. 2) including therein a first area 310 and a second area 320. A first sensor of a first scheme may be disposed in the first area 310 of the display 300, and a second sensor of the first scheme and/or a third sensor of a second scheme may be disposed in the second area 320. The display 300 in FIG. 3C may not have a cut structure unlike those in FIGS. 3A and 3B. For example, the light transmittance and/or resolution of the third area 330 may be lower than those of the first area 310. According to an embodiment, the first sensor and the second sensor may detect a user input in the same scheme, i.e. the first scheme, and the processor 120 may detect a user's touch input detected on the touch screen using the first sensor and the second sensor. The third sensor of the second scheme may detect a user's force input applied to the touch screen. The force input may be an input in which a pressure in a designated range is applied to the touch screen by a user. The third sensor of the second scheme is disposed in the second area 320 of the display 300. However, in another embodiment, the third sensor may also be disposed in the first area 310 of the display 300, and may detect a force input on a specific point or a drag input detected in the state in which the force input is maintained.

Figure 4A:
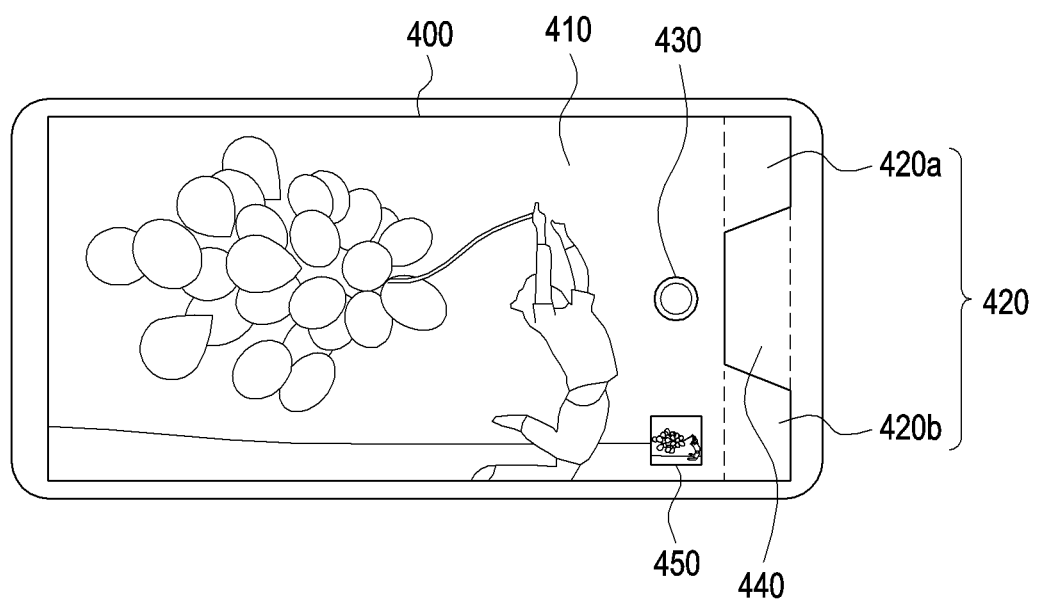
FIG. 4A is a view illustrating an exemplary configuration for providing an interface of an application according to various embodiments.
Figure 4B:
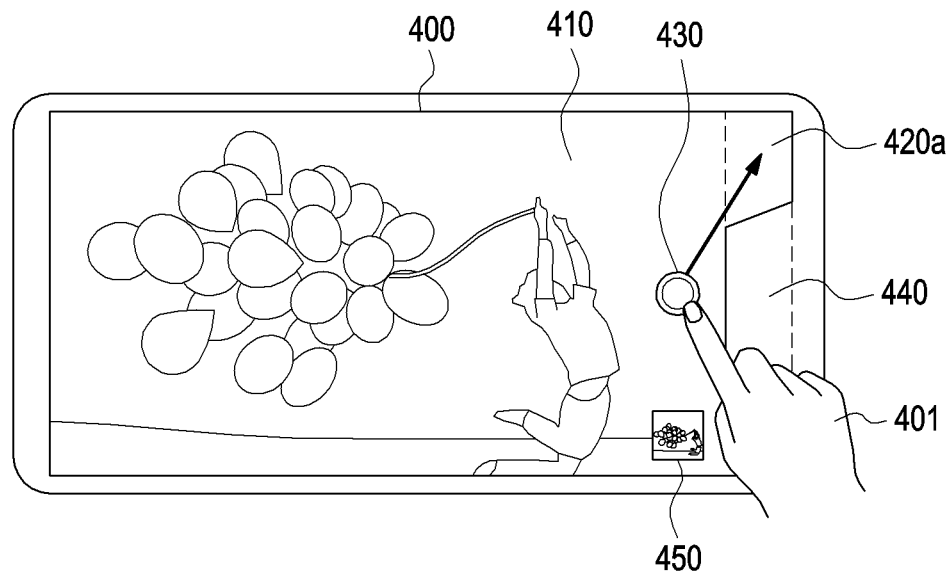
FIG. 4B is a view illustrating an exemplary configuration for providing an interface of an application according to various embodiments.
Figure 4C:
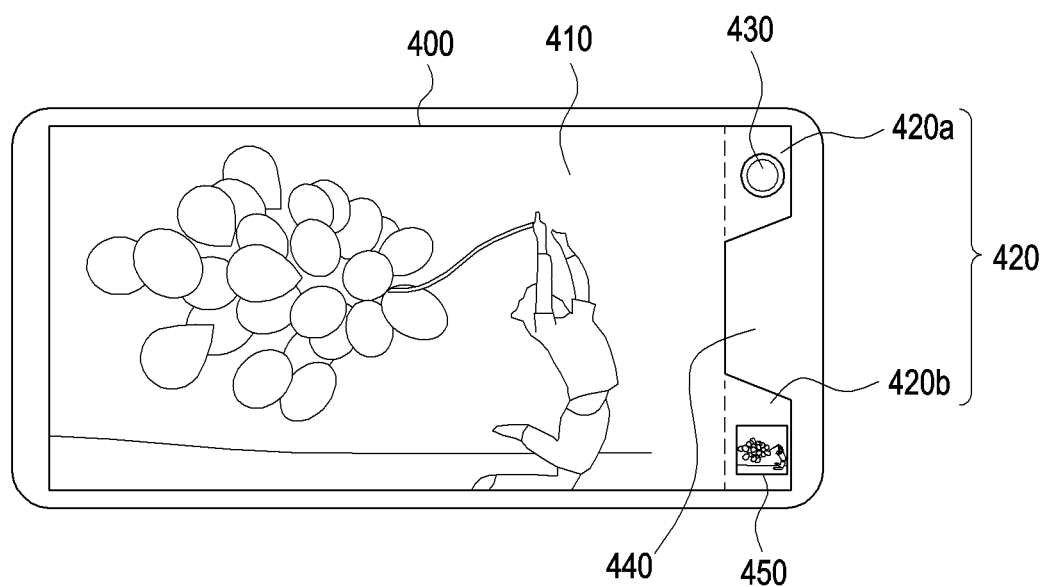
FIG. 4C is a view illustrating an exemplary configuration for providing an interface of an application according to various embodiments.
Figure 4D:
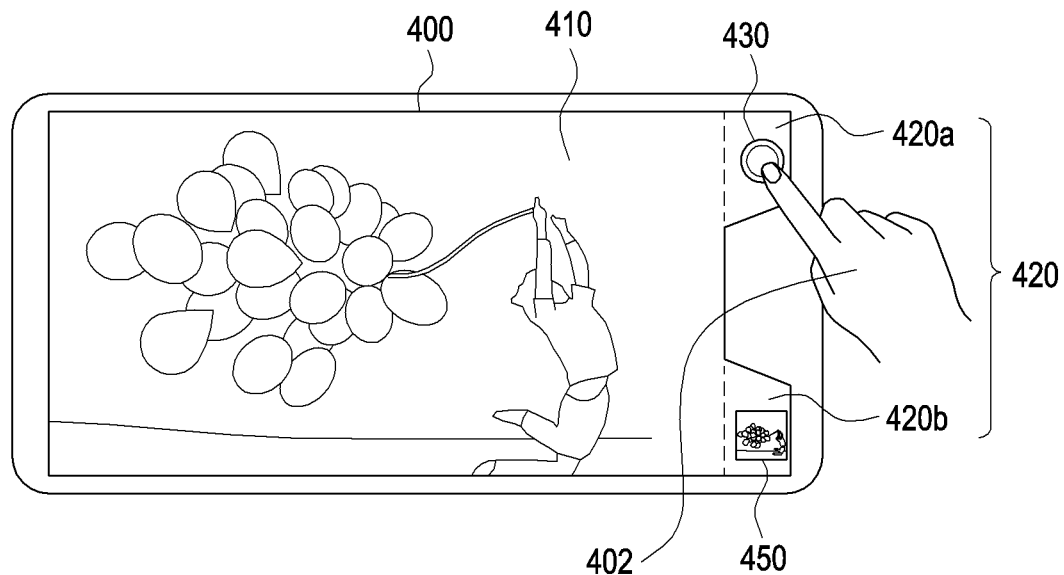
FIG. 4D is a view illustrating an exemplary configuration for providing an interface of an application according to various embodiments.
Figure 4E:
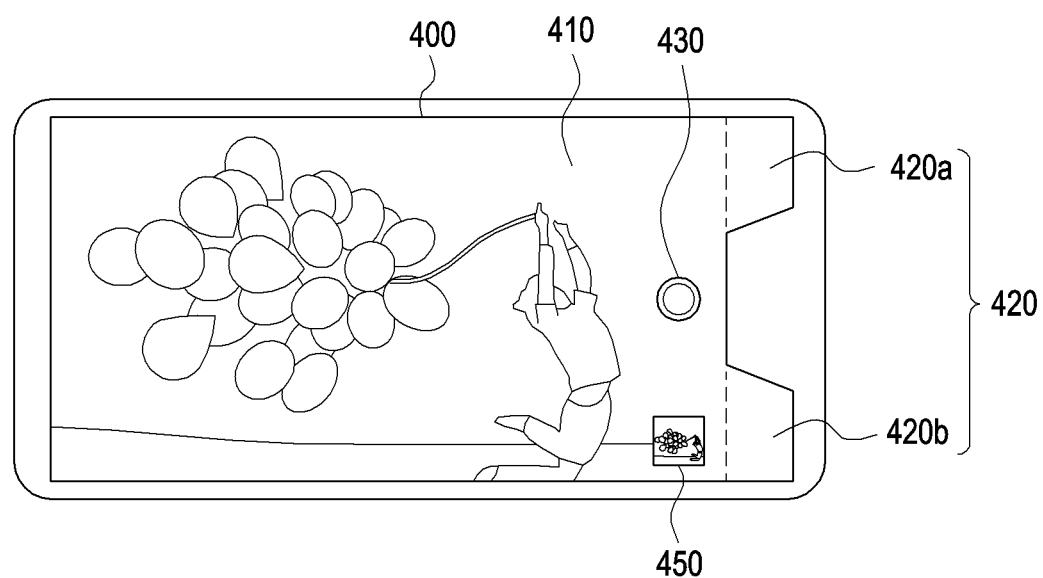
FIG. 4E is a view illustrating an exemplary configuration for providing an interface of an application according to various embodiments.
Figure 5:
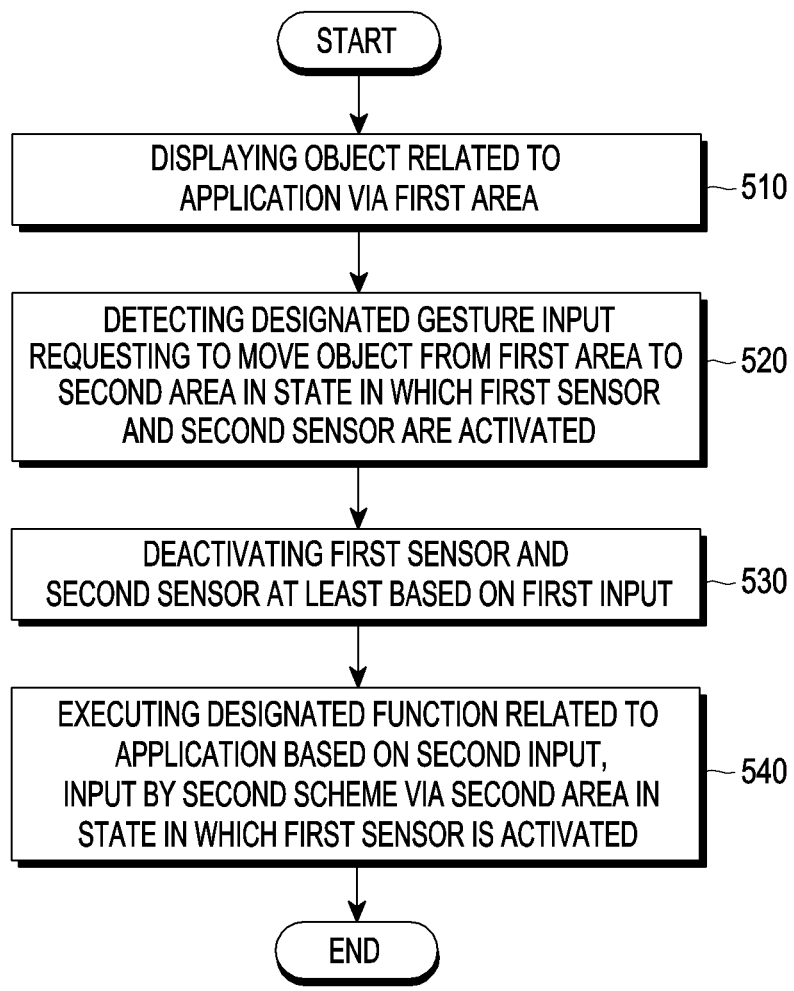
FIG. 5 is a flowchart illustrating a configuration for providing an interface of an application according to various embodiments.

FIG. 4A is a view illustrating an exemplary configuration for providing an interface of an application according to various embodiments. FIG. 4B is a view illustrating an exemplary configuration for providing an interface of an application according to various embodiments. FIG. 4C is a view illustrating an exemplary configuration for providing an interface of an application according to various embodiments. FIG. 4D is a view illustrating an exemplary configuration for providing an interface of an application according to various embodiments. FIG. 4E is a view illustrating an exemplary configuration for providing an interface of an application according to various embodiments. FIG. 5 is a flowchart illustrating a configuration for providing an interface of an application according to various embodiments.

Referring to FIG. 4, a display 400 (e.g., the display 210 in FIG. 2) of an electronic device (e.g., the electronic device 101 in FIG. 1) may include the first area 410 and a second area 420. The second area 420 may include designated first and second portions 420a and 420b. The electronic device 101 may provide, in a limited manner, a display function to the third region 440 cut in the form of a notch, and a front camera, a sensor, or the like may be disposed in the third area 440. A first sensor of a first scheme may be disposed in the first area 410, a second sensor of the first scheme and a third sensor of a second scheme may be disposed in the second area 420. Alternatively, the first sensor of the first scheme and the third sensor of the second scheme may also be disposed in the first area 410. The processor (e.g., the processor 120 in FIG. 1) of the electronic device 101 may display an interface of an application in the first area 410 and/or the second area 420.

In operation 510, the processor may display an object related to the application via the first area. Referring to FIG. 4A, the processor 120 may execute an application related to a camera (e.g., a camera application), and may display the interface of the camera application in the first area 410 and/or the second area 420. The interface may include a first object 430 corresponding to a photographing button for a user to perform photographing and/or a second object 450 for executing a gallery application, and the processor 120 may display the first object 430 and/or the second object 450 using at least a portion of the first area 410. The processor 120 may detect a user input made via a touch screen using the first sensor of the first scheme, and may execute a function of an application corresponding to the user input. For example, the processor 120 may detect a touch input applied to the first object 430 via the first sensor, and photographing using a camera may be performed at least based on the detected result. The processor 120 may detect a touch input applied to the first object 430 via the first sensor, and may execute a gallery application at least based on the detected result.

In operation 520, the processor 120 may detect a designated gesture input (e.g., a drag input) that requests to move an object from the first area 410 to the second area 420 (e.g., to move the display position of the object) in the state in which the first sensor and the second sensor are activated. Operation 520 has been described with reference to a drag input as an example, but as designated inputs made by a user or via an application, a system, or the like, various types of designated gesture inputs including a drag input may be applied. According to various embodiments, a sensor (e.g., an image sensor, a face recognition sensor, or a proximity sensor) disposed in the third area 440 may detect a gesture input. Referring to FIG. 4B, the display 400 may include a first area 410 and a second area 420, and the electronic device 101 may provide a display function to the third area 440 in a limited manner (e.g., not providing, or providing at a low resolution). The processor 120 may display the interface of the camera application using at least one of the first area 410 or the second area 420. The processor 120 may detect a designated gesture (e.g., a drag input) requesting to move the first object 430 from the first area 410 to the second area 420 in the state in which the first sensor and the second sensor are activated. The processor 120 may change the configuration of the interface by moving the first object 430 and/or the second object 450 to the second area 420 at least based on the drag input. For example, in FIG. 4B, before detecting a designated gesture input (e.g., a drag input) 401 which moves the first object 430 to the designated first portion 420a of the second area 420, the processor 120 may provide an interface of a first configuration having the first object 430 and the second object 450 as in the example illustrated in FIG. 4A. For example, when the drag input 401 is detected, the processor 120 may provide an interface of a second configuration in which the first object 430 and the second object 450 are moved to designated first portion 420a and second portion 420b of the second area 420, respectively, as in the example illustrated in FIG. 4C. According to various embodiments, when the designated gesture input (e.g., drag input) 401 is detected, the processor 120 may display the first object 430 in the designated first portion 420a of the second area 420, and may display the second object 450 in the designated second portion 420b of the second area 420. For example, based on the drag input 401 related to the first object 430, the processor 120 may automatically move the second object 450 to a designated area (e.g., 420b).

In operation 530, the processor 120 may deactivate the first sensor and the second sensor at least based on the first input. When a user's designated gesture input (e.g., a drag input) is detected, the processor 120 may display an interface of an application in the first area 410 and the second area 420 of the display 400 and may display the first object 430 and the second object 450 in respective portions (e.g., 420a and 420b) of the second area 420, as illustrated in FIG. 4C. According to an embodiment, at least based on a designated gesture input (e.g., a drag input), the processor 120 may deactivate sensors of a designated type (e.g., the first sensor disposed in the first area 410 and the second sensor disposed in the second area 420) among the sensors disposed in the display 400. After deactivating the first sensor and the second sensor based on the drag input, even if the user's touch input is applied to the first area 410 and the second area 420, the processor 120 may not perform an operation related to the touch input.

In operation 540, in the state in which the third sensor is activated, the processor 120 may execute a designated function related to the application based on the second input, input by the second scheme via the second area. Referring to FIG. 4C, the processor 120 may detect a force input applied to the second area 420 using a third sensor. When the force input related to the first object 430 displayed in the second area 420 is detected, the processor 120 may detect the force input related to the first object 430 via the activated third sensor, and may perform a function (e.g., photographing by a camera) at least based on the force input. Alternatively, when a force input related to the second object 450 is detected, the processor 120 may detect the force input via the third sensor, and may perform a function (e.g., executing a gallery application) at least based on the force input. Meanwhile, although it has been described that the third sensor may be disposed in the second area 420, in various embodiments, the third sensor may be disposed in the entire area of the display 400 by being disposed in the first area 410 as well as the second area 420. For example, the third sensor may be disposed in the entire area of the display 400, and after performing operation 520 and/or operation 530, the processor 120 may deactivate the third sensor disposed on the first area 410, and may activate only the third sensor disposed in the second area 420. The processor 120 may perform operation 540 using the third sensor activated only in the second area 420.

FIGS. 4A to 4E have been described based on a display having the form illustrated in FIG. 3A, but the same content may be applied to the displays having the forms illustrated in FIGS. 3B and 3C. For example, items applied to the first area 410 in FIGS. 4A to 4E may be applied to the first area 310 in FIG. 3B or 3C, and items applied to the second area 420 in FIGS. 4A to 4E may be equally applied to the second area 320 in FIG. 3B or FIG. 3C.

Figure 6:
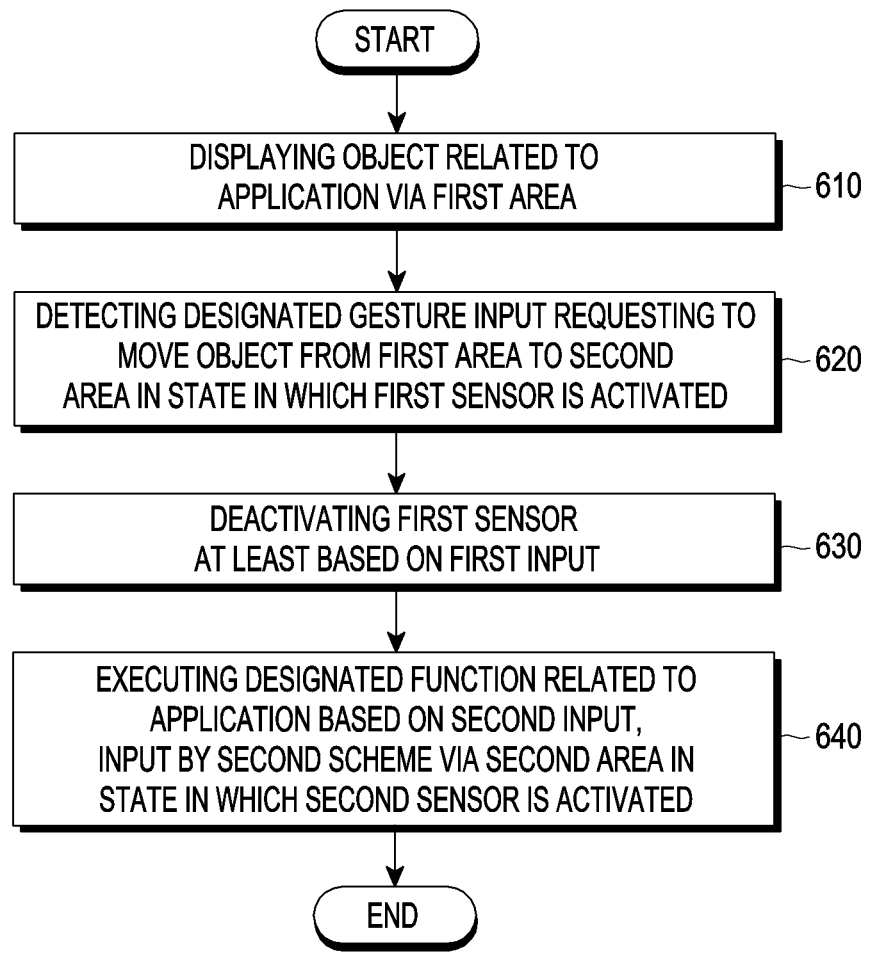
FIG. 6 is a flowchart illustrating a configuration for providing an interface of an application according to various embodiments.

FIG. 6 is a flowchart illustrating a configuration for providing an interface of an application according to various embodiments.

Referring to FIG. 4A, a display 400 (e.g., the display 210 in FIG. 2) of an electronic device (e.g., the electronic device 101 in FIG. 1) may include a first area 410 and a second area 420. A first sensor of a first scheme may be disposed in the first area 410, the first sensor and a second sensor of a second scheme may be disposed in the second area 420. Alternatively, the second sensor of the second scheme may also be disposed in the first area 410 together with the first sensor. The processor (e.g., the processor 120 in FIG. 1) of the electronic device 101 may display an interface of an application in the first area 410 and the second area 420. In operation 610, the processor may display an object related to the application via the first area. Referring to FIG. 4A, the processor 120 may execute an application related to a camera (e.g., a camera application), and may display the interface of the camera application in the first area 410 and/or the second area 420. The interface may include a first object 430 for allowing the user to perform photographing and a second object 450 for executing a gallery application, and the processor 120 may display the first object 430 and/or the second object 450 using at least a portion of the first area 410. The processor 120 may detect a user input made via a touch screen using the first sensor of the first scheme, and may execute a function of an application corresponding to the user input. The processor 120 may detect a touch input applied to the first object 430 via the first sensor, and photographing using a camera may be performed at least based on the detected result. The processor 120 may detect a touch input applied to the second object 450 via the first sensor, and may execute a gallery application at least based on the detected result.

In operation 620, the processor 120 may detect a designated gesture input (e.g., a drag input) that moves an object from the first area 410 to the second area 420 in the state in which the first sensor is activated. Operation 620 has been described with reference to a drag input as an example, but as designated inputs made by a user or via an application, a system, or the like, various types of designated gesture inputs including a drag input may be applied. According to various embodiments, a sensor (e.g., an image sensor, a face recognition sensor, or a proximity sensor) disposed in the third area 440 may detect a gesture input. When a user's touch input 401 intended to move the first object 430 to the second area 420 is applied, the processor 120 may detect a designated gesture input (e.g., a drag input) activated in the state in which the first sensor of the first scheme is activated. Alternatively, an input related to an object designated by the user may be detected. When detecting a drag input for moving the first object 430 from the first area 410 to the second area 420, the processor 120 may change the configuration of the interface by moving the first object 430 and/or the second object 450 to the second area 420. For example, in FIG. 4B, before detecting a designated gesture input (e.g., a drag input) 401 for moving the first object 430 to the designated first portion 420*a* of the second area 420, the processor 120 may display the interface of the application in a first configuration. For example, when the drag input 401 is detected, the processor may provide an interface of a second configuration in which the first object 430 and the second object 450 are moved to a designated first portion 420*a* and second portion 420*b* of the second area 420, respectively, as in the example illustrated in FIG. 4C. According to various embodiments, when the designated gesture input (e.g., a drag input) 401 is detected, the processor 120 may display the first object 430 in the designated first portion 420*a* of the second area, and may display the second object 450 in the designated second portion 420*b* of the second area. For example, based on the drag input 401 related to the first object 430, the processor 120 may automatically move the second object 450 to a designated area (e.g., 420*b*).

In operation 630, the processor 120 may deactivate the first sensor at least based on the first input. When a user's designated gesture input (e.g., a drag input) is detected, the processor 120 may display an interface of an application in the first area 410 and the second area 420 of the display 400 and may display the first object 430 and the second object 450 in respective areas of the second area 420, as illustrated in FIG. 4C. According to an embodiment, at least based on a designated gesture input, the processor 120 may deactivate sensors of a designated type (e.g., the first sensor disposed in the first area 410 and the second sensor disposed in the second area 420) among the sensors disposed in the display 400. After deactivating the first sensor and the second sensor based on the drag input, even if the user's touch input is applied to the first area 410 and the second area 420, the processor 120 may not perform an operation corresponding to the touch input.

In operation 640, in the state in which the second sensor is activated, the processor 120 may execute a designated function related to the application based on the second input, input by the second scheme via the second area. Referring to FIG. 4C, the processor 120 may detect a force input applied to the second area 420 using a second sensor. When a force input on the first object 430 corresponding to a photographing button is detected, the processor 120 may perform photographing using a camera. In the foregoing, although it has been described that the second sensor is disposed only in the second area 420, in various embodiments, the second sensor may be disposed in the entire area of the display 400 by being disposed in the first area 410 as well as the second area 420. The second sensor disposed in the second area 420 described above with reference to FIG. 5 may be the same sensor using the first scheme as the first sensor disposed in the second area 420 described above with reference to FIG. 6. The third sensor disposed in the second area 420 of FIG. 5 may be a sensor which is different, in sensing scheme, from the second sensor described above with reference to in FIG. 6. In the following description made with reference to the following drawings, the first sensor, the second sensor, and the third sensor described with reference to FIG. 5 will be used.

For example, the third sensor may be disposed in the entire area of the display 400, and after performing operation 620 and/or operation 630, the processor 120 may deactivate the third sensor disposed on the first area 410, and may activate only the third sensor disposed in the second area 420. The processor 120 may perform operation 640 using the third sensor activated only in the second area 420.

Figure 7:
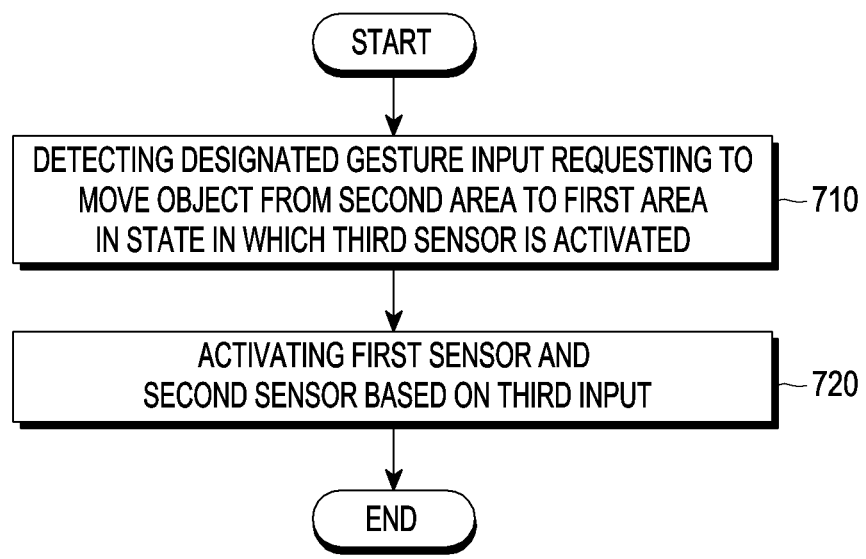
FIG. 7 is a flowchart illustrating a configuration in which an electronic device according to various embodiments provides an interface of an application.

FIG. 7 is a flowchart illustrating a configuration in which an electronic device according to various embodiments provides an interface of an application.

In operation 710, a processor (e.g., the processor 120 in FIG. 1) may detect a designated gesture input (e.g., a drag input) that requests to move an object from the second area 420 to the first area 410 (e.g., to move the display position of the object) in the state in which the third sensor is activated. Hereinbelow, an electronic device including a display in which the first sensor of the first scheme is disposed in the first area and the second sensor of the first scheme and the third sensor of the second scheme are disposed in the second area as described in FIG. 5 will be described with reference to FIG. 7. As described above, the third sensor may be disposed only in the second area 420, or may be disposed in both the first area 410 and the second area 420. Hereinafter, an embodiment in which the third sensor is disposed in both the first area 410 and the second area 420 will be described with reference to FIG. 7. Referring to FIG. 4D, the display 400 may include the first area 410 and the second area 420 to provide a display function, the third area 330 may have a structure in which fewer pixels are disposed compared to the first area 310 or the second area 320, and one or more sensors for receiving light may be disposed in the third area 330. Based on the second input in operation 540 in FIG. 5 described above, the processor 120 may display the interface of the camera application in the first area 410 and the second area 420, and may display the first object 430 and the second object 450 on the first portion 420a of the second area 420 and the second portion 420b of the second region 420, respectively. When a force input 402 requesting to move the first object 430 from the designated first portion 420a of the second area 420 to the first area 410 is applied, the processor 120 may detect an input that applies a pressure in a specified range in the state in which the third sensor is activated. When the processor 120 detects a drag input that applies a pressure in a designated range to move the first object 430 from the first portion 420a of the second area 420 to the first area 410, the processor 120 may rearrange and change the configuration of the interface so as to move the first object 430 disposed in the first portion 420a of the second area 420 and the second object 450 disposed in the second portion 420b of the second area 420 to the first area 410. For example, referring to FIG. 4D, when the drag input 402 that applies a pressure in a designated range for moving the first object 430 to the second area 420 is detected, the configuration may be changed by moving the interface as illustrated in FIG. 4E. Referring to FIG. 4E, the processor 120 may display the interface of the application in the first area 410 and the second area 420 of the display 400, and may display the first object 430 and the second object 450 in the first area 410. In the foregoing, the configuration for changing the interface by moving the first object 430 has been described, but the interface may also be changed in the same manner when an input is applied to the second object 450 and the second object 450 is moved.

In operation 720, the processor 120 may activate the first sensor and the second sensor based on the third input. The processor 120 may activate the first sensor disposed in the first area 410 and the second sensor disposed in the second area 420 while changing the interface of the application according to the drag input that applies the pressure in the specified range. The processor 120 may detect a touch input in the entire area of the display 400 by activating the first sensor and the second sensor. The processor 120 may detect a touch input on the first object 430 or the second object 450 using the first sensor and the second sensor, and may perform a designated function for the detected object.

Figure 8A:
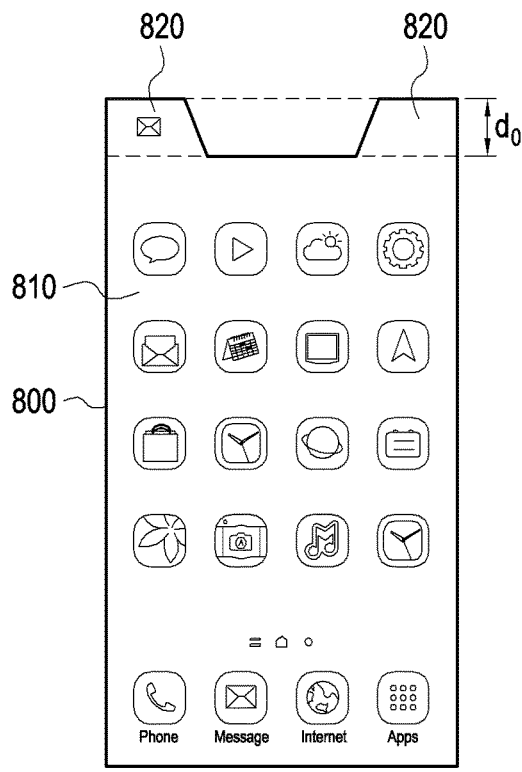
FIG. 8A is a view illustrating an exemplary configuration in which an electronic device according to various embodiments displays an alarm of an application.
Figure 8B:
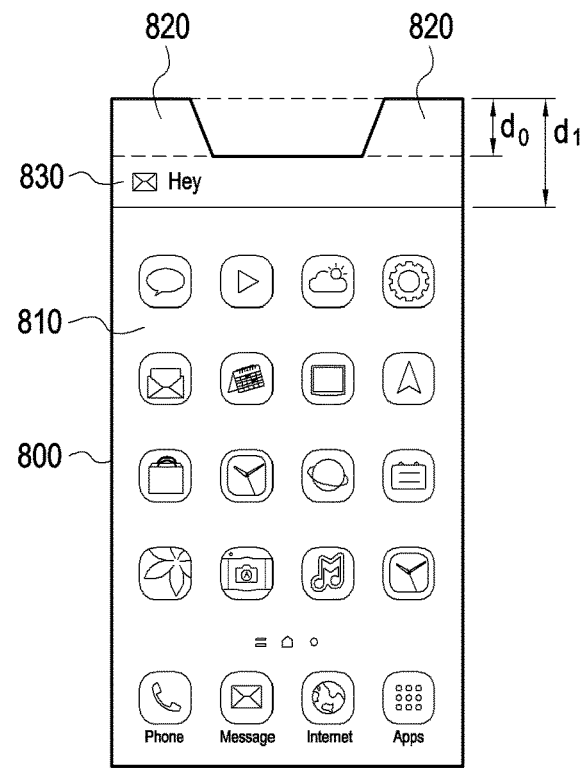
FIG. 8B is a view illustrating an exemplary configuration in which an electronic device according to various embodiments displays an alarm of an application.
Figure 8C:
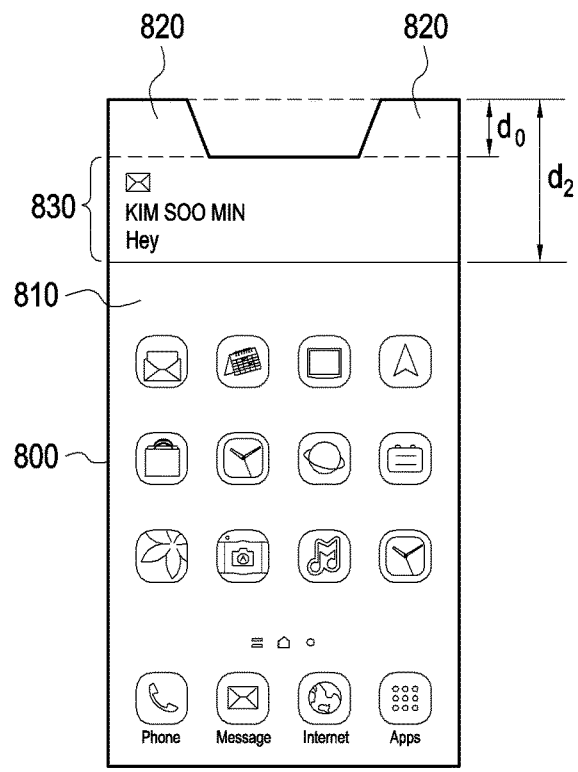
FIG. 8C is a view illustrating an exemplary configuration in which an electronic device according to various embodiments displays an alarm of an application.
Figure 9:
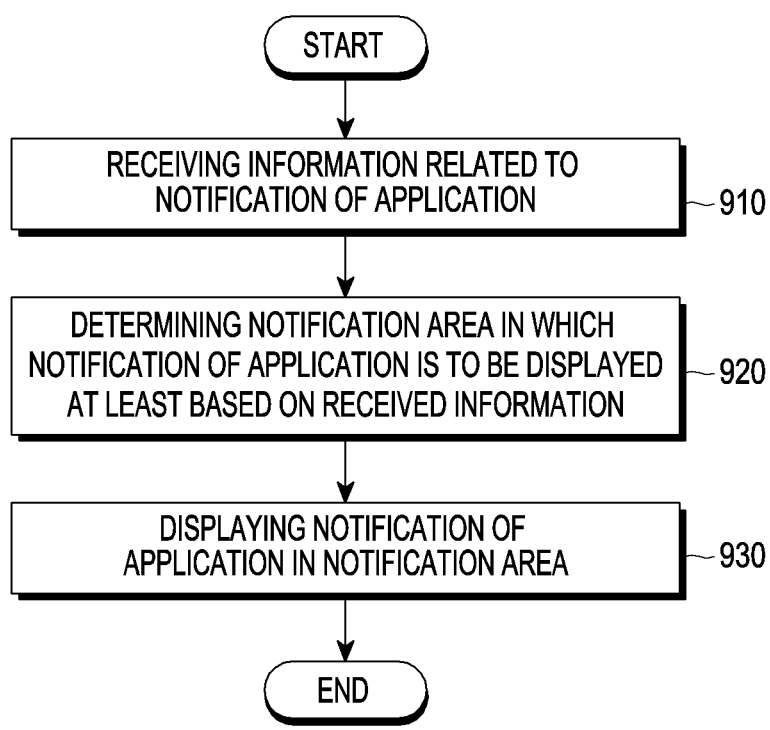
FIG. 9 is a flowchart illustrating a method of displaying an alarm of an application by an electronic device according to various embodiments.

FIG. 8A is a view illustrating an exemplary configuration in which an electronic device according to various embodiments displays an alarm of an application. FIG. 8B is a view illustrating an exemplary configuration in which an electronic device according to various embodiments displays an alarm of an application. FIG. 8C is a view illustrating an exemplary configuration in which an electronic device according to various embodiments displays an alarm of an application. FIG. 9 is a flowchart illustrating a method of displaying information related an application (e.g., a notification of an application) by an electronic device according to various embodiments.

In operation 910, the processor (e.g., the processor 120 in FIG. 1) may receive information related to an application (e.g., a notification of the application). Referring to FIGS. 8A and 8B, the processor 120 may receive information related to a notification of an application in order to display the notification of the application. For example, the notification of the application may include an event displayed on the display in a pop-up format such as display of a received message. The processor 120 may receive information related to the notification of the application from a designated external electronic device, a server, or the like. The received information may include setting of the application, information to display the notification (text or image), the size of an image to display the notification, the length of the text, or the like.

In operation 920, the processor 120 may determine the size of a notification area to display the notification of the application, at least based on the received information. In operation 930, the processor 120 may display the notification of the application in the notification area. The processor 120 may determine the size of the notification area based on the setting of the application, the setting of a system, the type of information to display the notification (text or image), the size of an image to display the notification, the length of the text, or the like. For example, referring to FIG. 8A, the processor 120 may display the notification in the second area 820 having a length of d0 from the top of the display. For example, the interface of the running application may be displayed in the first area 810 of the display 800, and a notification related to the application may be displayed in the second area 820. For example, the processor 120 may display the icon of the application by setting the second area 820 as a notification area 820.

According to various embodiments, the processor 120 may display the notification related to the application in the notification area 830 having a length d1 from the top of the display. For example, referring to FIG. 8B, the processor 120 may identify the received information, and may determine the size of the notification area 830 to have the length d1 from the top of the display. The processor 120 may display the interface of the application in the first area 810 of the display 800, may display a status bar of the electronic device in the second area 820, and may display the brief content of a message in the notification area 830 along with an icon of a message application. For example, the notification area 830 may display the brief content of the message ("Hey") along with the application icon. Unlike the illustration of FIG. 8A, since the content of the message is displayed together with the icon of the message application in FIG. 8B, a notification area of a second size having the length d1 longer than d0 may be displayed on the display. According to various embodiments, referring to FIG. 8C, the processor 120 may display a notification related to the application in the notification area 830 having the length of d2 from the top of the display. The processor 120 may identify the received information, and may determine the size of the notification area 830 to have the length d2 from the top of the display. The processor 120 may display the interface of the application in the first area 810 of the display 800, may display a status bar of the electronic device in the second area 820, and may display the brief content of a message in the notification area 830 along with an icon of a message application. For example, the notification area 830 may display the content of the message along with the application icon. A notification having more content compared to that the notification area of FIG. 8B may be displayed in the notification area of FIG. 8C. For example, in the notification area of FIG. 8C, not only the content of the message, but also the user name of the electronic device which transmits the message may be displayed. However, the configuration in which the notification of the application is displayed is not limited to the notification of the message application of FIGS. 8A to 8C, but notifications of various applications may be provided. In FIG. 8C, since the content of the message is displayed together with the icon of the message application, the notification area 830 of the second size having the length d2 longer than d1 may be displayed on the display.

FIGS. 8A to 8B have been described based on the display having the form illustrated in FIG. 3A, the same content can also be applied to the displays having the forms illustrated in FIGS. 3B and 3C. For example, items applied to the first area 810 in FIGS. 8A and 8B may be applied to the first area 310 in FIG. 3B or FIG. 3C, and items applied to the second areas 820 in FIGS. 8A and 8B may be equally applied to the second areas 320 in FIG. 3B or FIG. 3C.

Figure 10A:
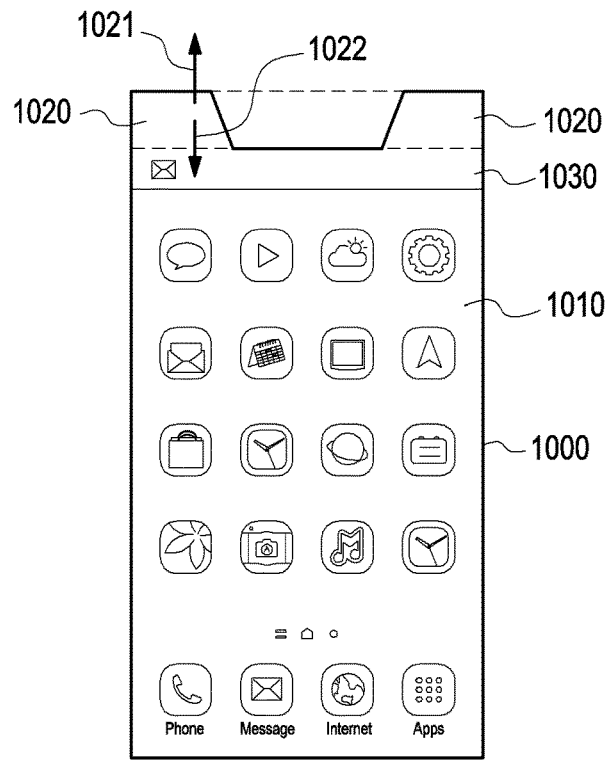
FIG. 10A is a view illustrating an exemplary configuration in which an electronic device according to various embodiments provides an interface related to a notification of an application.
Figure 10B:
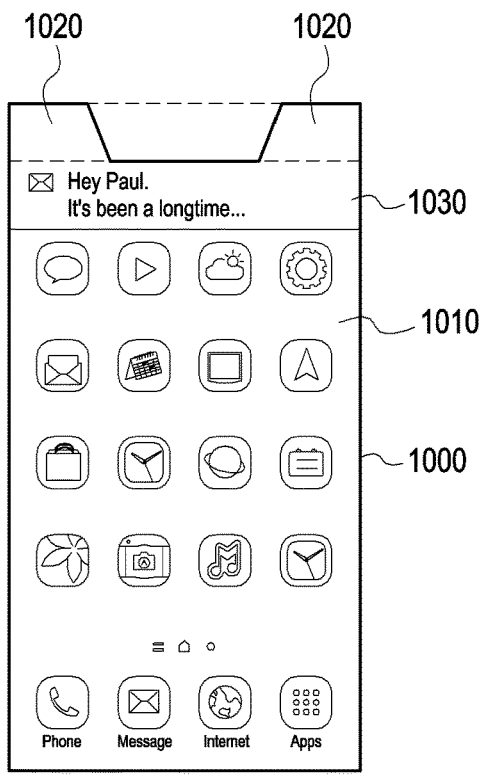
FIG. 10B is a view illustrating an exemplary configuration in which an electronic device according to various embodiments provides an interface related to a notification of an application.
Figure 10C:
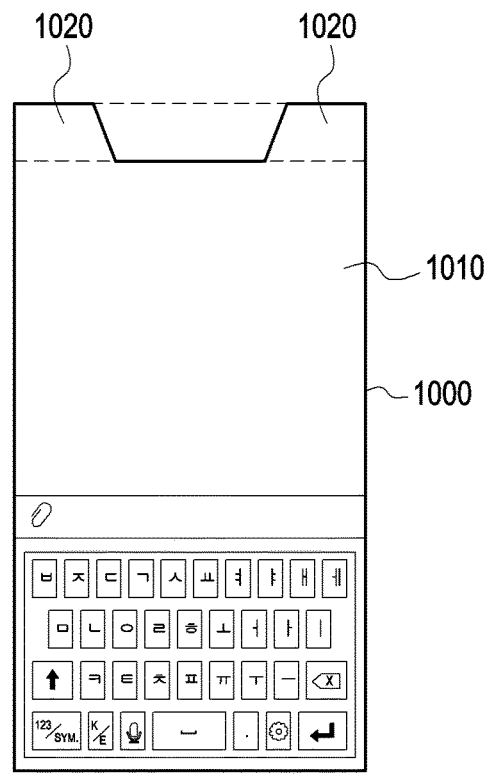
FIG. 10C is a view illustrating an exemplary configuration in which an electronic device according to various embodiments provides an interface related to a notification of an application.
Figure 11:
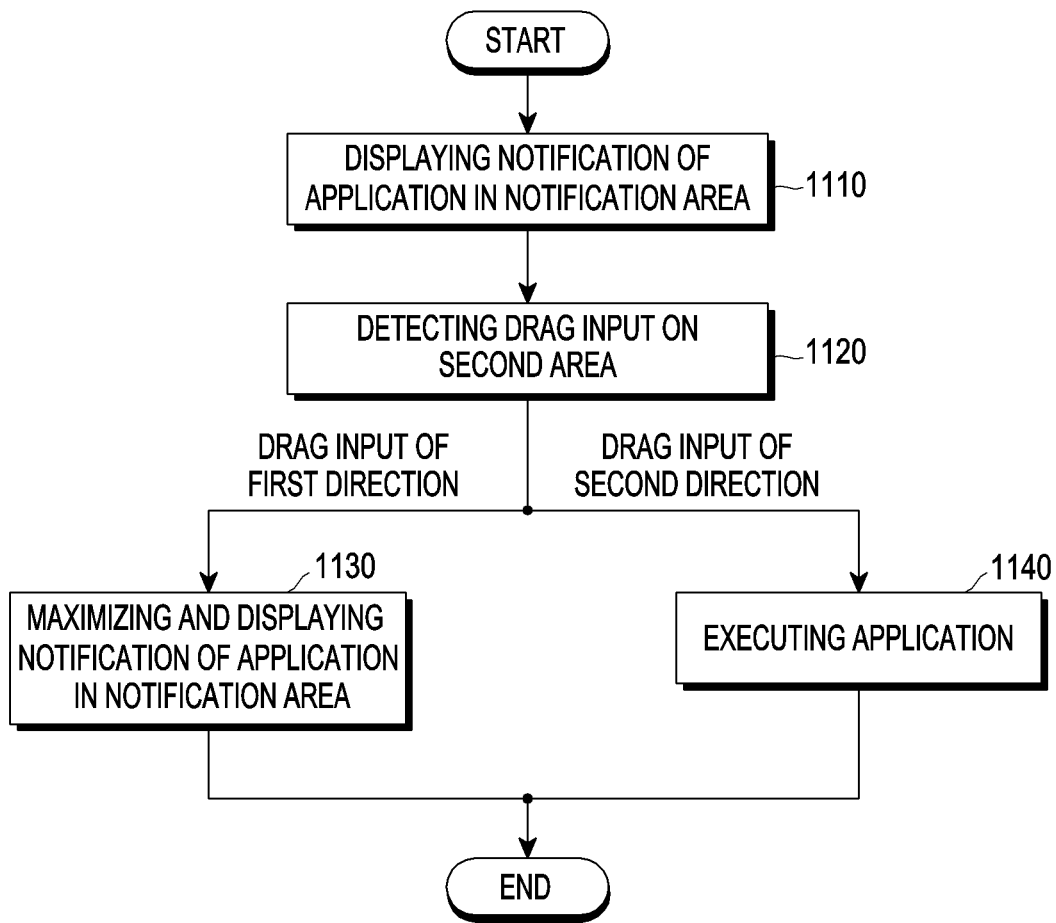
FIG. 11 is a flowchart illustrating a method of providing an interface related to a notification of an application by an electronic device according to various embodiments.

FIG. 10A is a view illustrating an exemplary configuration in which an electronic device according to various embodiments provides an interface related to a notification of an application. FIG. 10B is a view illustrating an exemplary configuration in which an electronic device according to various embodiments provides an interface related to a notification of an application. FIG. 10C is a view illustrating an exemplary configuration in which an electronic device according to various embodiments provides an interface related to a notification of an application. FIG. 11 is a flowchart illustrating a method of providing an interface related to a notification of an application by an electronic device according to various embodiments.

In operation 1110, the processor (e.g., the processor 120 in FIG. 1) may display a notification of an application in a notification area. Referring to FIG. 10A, a display 1000 (e.g., the display 210 in FIG. 2) may include a first area 1010 and a second area 1020. As described with reference to FIG. 8A, the processor 120 may receive information related to a notification of an application, and may display a notification area 1030 in a first size based on the received information. For example, the processor 120 may display an icon of a message application in the second area 1020 or the notification area 1030.

In operation 1120, the processor 120 may detect a designated gesture input (e.g., a drag input) on the second area. The processor 120 may detect a user's drag input using a second sensor disposed in the second area. For example, the processor 120 may detect a drag input detected in a first direction 1021 or a second direction 1022 in the second area 1020. The processor 120 may preset a drag input within a specified angle range in the first direction 1021 or the second direction 1022. When detecting a drag input from the user in the second area 1020, the processor 120 may identify the direction of the detected drag input. The processor 120 may identify whether the direction of the identified drag input is the first direction 1021 or the second direction 1022. In the drawing, the first direction 1021 and the second direction 1022 are illustrated in the up and down direction, but may be variously set according to the user's setting.

In operation 1130, when the drag input is in the first direction, the notification of the application may be maximized and displayed in the notification area. When it is identified that the drag input detected by the processor 120 is in the first direction 1021, the notification area 1030 may be maximized and the notification of the application may be displayed in a second size. For example, when a drag input in the first direction 1021 is detected in FIG. 10A, as illustrated in FIG. 10B, the processor 120 may display the content of the received message together with the icon of the message application in the notification area 1030. The processor 120 may display a running application (e.g., a launcher application) in the first area 1010, may display a status bar in the second area 1020 as it is, and may display a notification in the notification area 1030 separate from the second area 1020. The processor 120 may display the notification area 1030 in the first area 1010 to be adjacent to the second area 1020.

In operation 1140, when the drag input is in the second direction, the application may be executed in the notification area. When the drag input detected by the processor 120 is in the second direction 1022, the application corresponding to the notification may be executed to display an execution screen of the application on the display instead of displaying the notification area 1030. For example, when a drag input in the second direction 1022 is detected in FIG. 10A, the processor 120 may display the execution screen of the message application in the first area 1010, as illustrated in FIG. 10C. The processor 120 may perform designated functions of the message application, such as receiving a message from a user via the execution screen of the message application, in the first area 1010. FIGS. 10A to 10C have been described based on the display having the form illustrated in FIG. 3A, the same content can also be applied to the displays having the forms illustrated in FIGS. 3B and 3C. For example, items applied to the first area 1010 in FIGS. 10A to 10C may be applied to the first area 310 in FIG. 3B or FIG. 3C, and items applied to the second areas 1020 in FIGS. 10A to 10C may be equally applied to the second areas 320 in FIG. 3B or FIG. 3C.

Figure 12A:
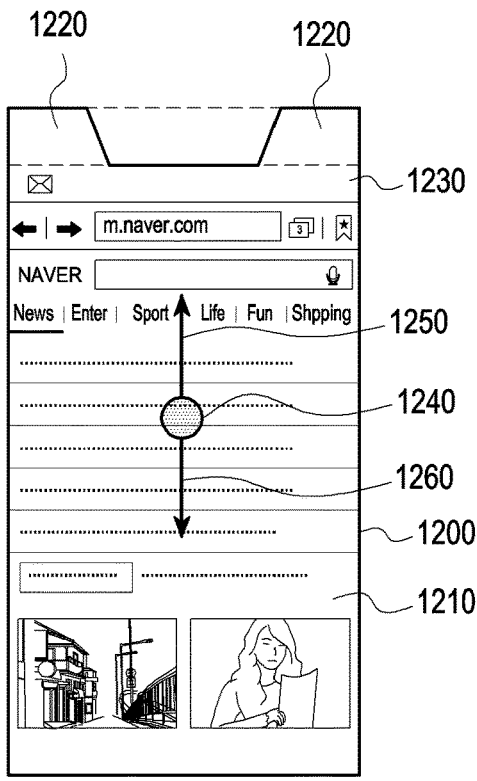
FIG. 12A is a view illustrating an exemplary configuration in which an electronic device according to various embodiments provides an interface related to a notification of an application.
Figure 12B:
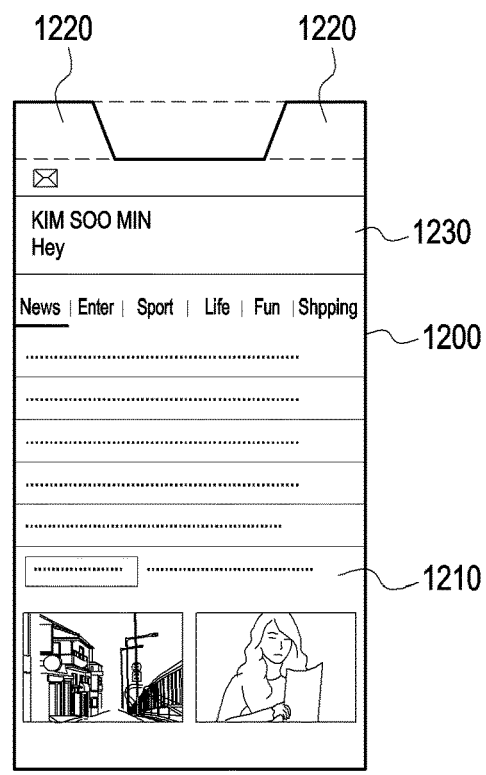
FIG. 12B is a view illustrating an exemplary configuration in which an electronic device according to various embodiments provides an interface related to a notification of an application.
Figure 12C:
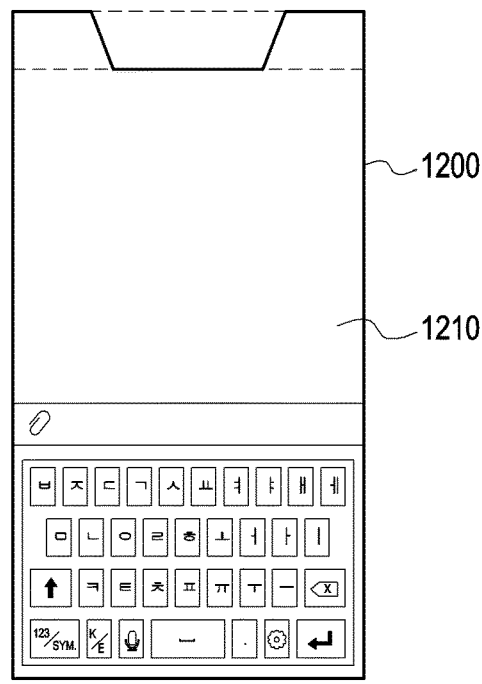
FIG. 12C is a view illustrating an exemplary configuration in which an electronic device according to various embodiments provides an interface related to a notification of an application.
Figure 13:
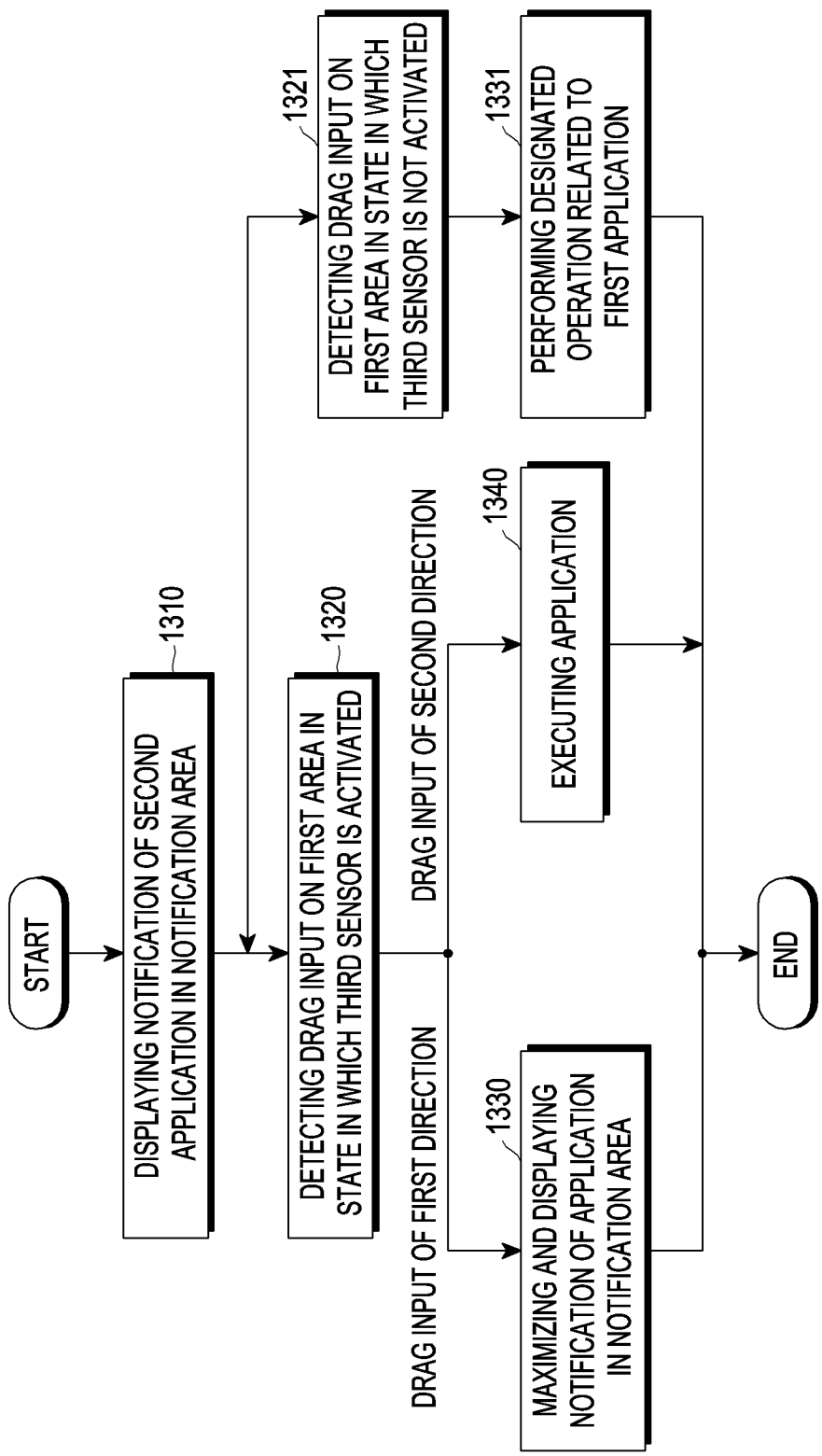
FIG. 13 is a flowchart illustrating a method of providing an interface related to a notification of an application.

FIG. 12A is a view illustrating an exemplary configuration in which an electronic device according to various embodiments provides an interface related to a notification of an application. FIG. 12B is a view illustrating an exemplary configuration in which an electronic device according to various embodiments provides an interface related to a notification of an application. FIG. 12C is a view illustrating an exemplary configuration in which an electronic device according to various embodiments provides an interface related to a notification of an application. FIG. 13 is a flowchart illustrating a method of providing an interface related to a notification of an application.

In operation 1310, the processor (e.g., the processor 120 in FIG. 1) may minimize and display the notification of the application in the notification area. Referring to FIG. 12A, a processor 120 may display a running browser application (e.g., a browser application) in a first area 1210 of a display 1200, may display a status bar in a second area 1220, and may minimize the notification of the application so as to display a notification area 1230 in a first size.

In operation 1320, the processor (e.g., the processor 120 in FIG. 1) may detect a drag input on the first area or the second area in the state in which the third sensor is activated. When the notification of the application is minimized and the notification area is displayed in the first size, the processor 120 may detect a drag input, performed in the state in which a force input is applied in a first direction 1250 or a second direction 1260 from a first point 1240 which is an arbitrary point included in the first area 1210 or the second area 1220, in the state in which a force sensor is activated. When the processor 120 detects a drag input in the state in which a force input is applied from the first point 1240, the processor may identify whether the direction of the drag input is the first direction 1250 or the second direction 1260.

In operation 1321, the processor 120 may detect a drag input on the first area in the state in which the third sensor is deactivated. In operation 1331, the processor 120 may perform a designated operation related to the first application. When at least one of the first sensor and the second sensor is activated and a touch input or a drag input is detected in the state in which the third sensor is not activated, the processor 120 may perform a designated function for the application displayed in the first area in response to the input. For example, the processor 120 may convert a browser application displayed in the first area 1310 to a screen corresponding to the touch input of a specific object, or may perform scrolling within an execution screen displayed in response to the drag input.

In operation 1330, when the direction of the drag input is the first direction, the processor 120 may maximize and display the notification of the application in the notification area. Referring to FIG. 12B, when it is identified that the drag input in the state in which the force input is applied thereto is in the first direction 1250, the processor 120 may maximize the notification area 1230 and may display the notification area 1230 in a second size. For example, the processor 120 may display a running application (e.g., a running launcher application) in the first area 1210 of the display 1200, may display a status bar in the second area 1220, and may display the content of a received message in the notification area 1230 together with the icon of a message application.

In operation 1340, when the direction of the drag input is the second direction, the processor 120 may execute the application. Referring to FIG. 12B, when it is identified that the drag input in the state in which the force input is applied is in the second direction 1260, the processor 120 may execute the application and so as to display the execution screen in the first area 1210 of the display without displaying the notification area 1230. Referring to FIG. 12C, the processor 120 may display the execution screen of the message application in the first area 1210 so as to receive a message from a user.

In various embodiments, when a drag input is detected, the processor may determine whether a pressure corresponding to the drag input is greater than or equal to a threshold. For example, when the corresponding pressure is less than a threshold, the processor may assign the corresponding drag input to the currently displayed application. For example, as in FIGS. 12A and 12B, when a web-browsing application is being displayed, the processor may assign the drag input to the web-browsing application. The application may perform page scrolling based on the assigned drag input, and a screen according to the execution result may be displayed. Meanwhile, when the corresponding pressure is greater than or equal to the threshold, the processor may use the drag input to control the notification area. As described above, the processor may use, based on the type of pressure of the received input, the corresponding input for controlling the notification area or may selectively use the corresponding input for application operation. FIGS. 12A to 12C have been described based on the display having the form illustrated in FIG. 3A, the same content can also be applied to the displays having the forms illustrated in FIGS. 3B and 3C. For example, items applied to the first area 1210 in FIGS. 12A to 12C may be applied to the first area 310 in FIG. 3B or FIG. 3C, and items applied to the second areas 1220 in FIGS. 12A to 12C may be equally applied to the second areas 320 in FIG. 3B or FIG. 3C.

An electronic device (e.g., the electronic device 101) according to various embodiments of the disclosure may include: a memory (e.g., the memory 130) configured to store data related to an application; a display (e.g., the display 210) including a first area in which a first sensor of a first scheme is disposed, and a second area in which a second sensor of the first scheme and a third sensor of a second scheme are disposed; and a processor (e.g., the processor 120). The processor 120 may be configured to: display an object related to the application via the first area; detect a first input for the object in the state in which the first sensor and the second sensor are activated; deactivate the first sensor and the second sensor while displaying the object in the second area at least based on the first input; and execute a designated function related to the application based on a second input, input by the second scheme via the second area in the state in which the third sensor is activated.

According to an embodiment, the third sensor of the second scheme is disposed in the first area of the display 210, and the processor 120 may be configured to: detect a third input for moving the object from the second area to the first area in the state in which the third sensor is activated; and activate the first sensor and the second sensor at least based on the third input. According to an embodiment, the processor 120 may be configured to: arrange an interface of the application in a first configuration and display the interface of the application in the first area; and arrange the interface of the application in a second configuration in response to the first input, and display the interface of the application in the first area and the second area. According to an embodiment, the processor 120 may be configured to: activate at least one of the first sensor or the second sensor so as to detect a touch input on the display 210 in at least one of the first area and the second area; and activate the third sensor so as to detect an input having a pressure in a designated range on the display 210 in the second area. According to an embodiment, the first input may include an input for moving the object from the first area to the second area. According to an embodiment, the processor 120 may be configured to: display a second object related to the application via the first area; and display the second object in the second area at least based on the first input. According to an embodiment, the second area may be disposed at one side of the first area.

An electronic device 101 according to various embodiments of the disclosure may include: a memory 130 configured to store data related to an application; a display 210 including a first area in which a first sensor of a first scheme is disposed, and a second area in which the first sensor and a second sensor of a second scheme are disposed; and a processor 120. The processor 120 may be configured to: display an object related to the application via the first area; identify a first input corresponding to the object in the state in which the first sensor is activated; deactivate the first sensor while displaying the object in the second area at least based on the first input; and execute a designated function related to the application based on a second input, input by the second scheme via the second area in the state in which the second sensor is activated.

According to an embodiment, the processor 120 may be configured to: detect a third input for moving the object from the second area to the first area in the state in which the second sensor is activated; and activate the first sensor at least based on the third input. According to an embodiment, the processor 120 may be configured to: arrange an interface of the application in a first configuration and display the interface of the application in the first area; and arrange the interface of the application in a second configuration in response to the first input, and display the interface of the application in the first area and the second area. According to an embodiment, the processor 120 may be configured to: activate the first sensor so as to detect a touch input on the display 210 in at least one of the first area or the second area; and activate the second sensor so as to detect an input having a pressure in a designated range on the display 210 in the second area. According to an embodiment, the first input for moving the object from the first area to the second area may be detected. According to an embodiment, the processor may be configured to: display a second object related to the application via the first area; and display the second object in the second area at least based on the first input. According to an embodiment, the second area may be disposed at one side of the first area.

An electronic device 101 according to various embodiments of the disclosure may include: a memory 130 configured to store an application, a display 210 including a first area in which a first sensor of a first scheme and a second sensor of a second scheme are disposed and a second area in which the first sensor and the second sensor are disposed and which is disposed at one side of the first area; and a processor 120. The processor may be configured to: receive information related to a notification of the application; determine a size of a notification area in which the notification of the application is to be displayed at least based on the received information; and display the notification of the application in the notification area to be adjacent to the second area.

According to an embodiment, the processor 120 may configured to: determine the size of the notification area in which the notification of the application is to be displayed to be a first size at least based on the received information; detect a drag input using the first sensor on the second area; and display the notification area in a second size when the direction of the drag input is a first direction, wherein the second size is larger than the first size. According to an embodiment, the processor 120 may be configured to: detect a drag input using the first sensor on the second area; and execute an application and display the execution screen of the application in the first area when the direction of the drag input is a second direction. According to an embodiment, the processor 120 may be configured to detect a pressure in a designated range detected on the display via the second sensor. According to an embodiment, the processor 120 may configured to: determine the size of the notification area in which the notification of the application is to be displayed to be a first size at least based on the received information; detect a drag input on the display 210 in the state in which the second sensor is activated; and display the notification area in a second size when the direction of the drag input is a first direction, wherein the second size is larger than the first size. According to an embodiment, the processor 120 may be configured to: detect a drag input on the display 210 in the state in which the second sensor is activated; and execute an application and display the execution screen of the application in the first area when the direction of the drag input is a second direction.

According to various embodiments of the disclosure, in a method of controlling an electronic device (e.g., the electronic device 101) including a display (e.g., the display 210) including a first area in which a first sensor of a first scheme is disposed, and a second area in which a second sensor of the first scheme and a third sensor of a second scheme are disposed, the method may include: an operation of displaying an object related to an application via the first area; an operation of detecting a first input for the object in the state in which the first sensor and the second sensor are activated; an operation of deactivating the first sensor and the second sensor while displaying the object in the second area at least based on the first input; and an operation of executing a designated function related to the application based on a second input, input by the second scheme via the second area in the state in which the third sensor is activated.

According to an embodiment, the method of controlling the electronic device 101 may include: an operation of detecting a third input for moving the object from the second area to the first area in the state in which the third sensor disposed in the first area and the second area is activated; and an operation of activating the first sensor and the second sensor at least based on the third input. The method according to an embodiment may include: an operation of arranging an interface of the application in a first configuration and displaying the interface of the application in the first area; and an operation of arranging the interface of the application in a second configuration in response to the first input, and displaying the interface of the application in the first area and the second area. The method according to an embodiment may include: an operation of activating at least one of the first sensor or the second sensor so as to detect a touch input on the display 210 in at least one of the first area and the second area; and an operation of activating the third sensor so as to detect an input having a pressure in a designated range on the display 210 in the second area. The method according to an embodiment may include an operation of detecting a first input for requesting to move the object from the first area to the second area. The method according to an embodiment may include an operation of displaying a second object related to the application via the first area; and an operation of displaying the second object in the second area at least based on the first input. According to an embodiment, the second area may be disposed at one side of the first area.

According to various embodiments of the disclosure, in a method of controlling an electronic device 101 including a display 210 including a first area in which a first sensor of a first scheme is disposed, and a second area in which the first sensor and a second sensor of a second scheme are disposed, the method may include: an operation of displaying an object related to an application via the first area; an operation of identifying a first input for moving the object from the first area to the second area in the state in which the first sensor is activated; an operation of deactivating the first sensor while displaying the object in the second area at least based on the first input; and an operation of executing a designated function related to the application based on a second input, input by the second scheme via the second area in the state in which the second sensor is activated.

The method according to an embodiment may include: an operation of detecting a third input for moving the object from the second area to the first area in the state in which the second sensor is activated; and an operation of activating the first sensor at least based on the third input. The method according to an embodiment may include: an operation of arranging an interface of the application in a first configuration and displaying the interface of the application in the first area; and an operation of arranging the interface of the application in a second configuration in response to the first input, and displaying the interface of the application in the first area and the second area. The method according to an embodiment may include: an operation of activating the first sensor so as to detect a touch input on the display 210 in at least one of the first area or the second area; and an operation of activating the second sensor so as to detect an input having a pressure in a designated range on the display 210 in the second area. The method according to an embodiment may include an operation of detecting a first input for requesting to move the object from the first area to the second area. The method according to an embodiment may include an operation of displaying a second object related to the application via the first area; and an operation of displaying the second object in the second area at least based on the first input. According to an embodiment, the second area may be disposed at one side of the first area.

According to various embodiments of the disclosure, in a method of controlling an electronic device 101 including a display 210 including a first area in which a first sensor of a first scheme and a second sensor of a second scheme are disposed and a second area in which the first sensor and the second sensor are disposed and which is disposed at one side of the first area, the method may include: an operation of receiving information related to a notification of an application; an operation of determining a size of a notification area in which the notification of the application is to be displayed at least based on the received information; and an operation of displaying the notification of the application in the notification area disposed in at least one of the first area or the second area.

The method according to an embodiment may include: an operation of determining the size of the notification area in which the notification of the application is to be displayed to be a first size at least based on the received information; an operation of detecting a drag input using the first sensor on the second area; and an operation of displaying the notification area in a second size when the direction of the drag input is a first direction, wherein the second size is larger than the first size. The method according to an embodiment may include: an operation of detecting a drag input using the first sensor on the second area; and an operation of executing an application and displaying the execution screen of the application in the first area when the direction of the drag input is a second direction. The method according to an embodiment may include an operation of detecting a pressure in a designated range detected on the display via the second sensor. The method according to an embodiment may include: an operation of determining the size of the notification area in which the notification of the application is to be displayed to be a first size at least based on the received information; an operation of detecting a drag input on the second area in the state in which the second sensor is activated; and an operation of displaying the notification area in a second size when the direction of the drag input is a first direction, wherein the second size is larger than the first size. The method according to an embodiment may include: an operation of detecting a drag input on the display 120 in the state in which the second sensor is activated; and an operation of executing an application and displaying the execution screen of the application in the first area when the direction of the drag input is a second direction.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a memory configured to store data related to an application;
   a display including a first area and a second area;
   a first sensor of a first scheme disposed in the first area of the display;
   a second sensor of the first scheme disposed in the second area of the display;
   a third sensor of a second scheme; and
   a processor,
   wherein the processor is configured to:
      control the display to display an object related to the application via the first area;
      identify a first input for the object in the first area in a state in which the first sensor and the second sensor are activated;
      deactivate the first sensor and the second sensor and move the object to the second area from the first area in response to the first input;
      display the object in the second area in a state in which the third sensor is activated; and
      execute a designated function related to the application based on a second input for the object in the second area, wherein the second input is input by the second scheme and sensed by the third sensor via the second area.

2. The electronic device of claim 1, wherein the processor is further configured to:
   detect a third input for moving the object from the second area to the first area in a state in which the third sensor is activated, and the first sensor and the second sensor are deactivated; and activate the first sensor and the second sensor at least based on the third input.

3. The electronic device of claim 1, wherein the processor is further configured to;
   control the display to arrange an interface of the application in a first configuration and to display the interface of the application using the first area; and
   control the display to arrange the interface of the application in a second configuration in response to the first input, and to display the interface of the application using at least one of the first area or the second area.

4. The electronic device of claim 1, wherein the processor is further configured to:
   activate at least one of the first sensor or the second sensor so as to detect a touch input on the display in at least one of the first area and the second area; and
   activate the third sensor so as to detect an input having a pressure in a designated pressure range on the display in the second area.

5. The electronic device of claim 1, wherein the first input includes a drag input for moving the object from the first area to the second area.

6. The electronic device of claim 1, wherein the processor is further configured to:
   control the display to display a second object related to the application via the first area; and
   control the display to display the second object in the second area at least based on a fourth input.

7. The electronic device of claim 1, wherein the display includes a third area in which at least one sensor configured to receive light is disposed, and
   the second area is disposed adjacent to the third area at one side of the first area.

8. An electronic device comprising:
   a memory configured to store data related to an application;
   a display including a first area and a second area;
   a first sensor of a first scheme disposed in the first area and the second area;
   a second sensor of a second scheme disposed in the second area; and
   a processor,
   wherein the processor is configured to:
      control the display to display an object related to the application via the first area;
      identify a first input corresponding to the object in the first area in a state in which the first sensor is activated;
      deactivate the first sensor and move the object from the first area to the second area in response to the first input;
      display the object in the second area in a state in which the second sensor is activated; and
      execute a designated function related to the application based on a second input for the object in the second area, wherein the second input is input by the second scheme and sensed by the second sensor via the second area.

9. The electronic device of claim 8, wherein the processor is further configured to:
   detect a third input for moving the object from the second area to the first area in a state in which the second sensor is activated; and
   activate the first sensor at least based on the third input.

10. The electronic device of claim 8, wherein the processor is further configured to:
    control the display to arrange an interface of the application in a first configuration and to display the interface of the application using the first area; and control the display to arrange the interface of the application in a second configuration in response to the first input, and to display the interface of the application using at least one of the first area or the second area.

11. The electronic device of claim 8, wherein the processor is further configured to:
    activate the first sensor so as to detect a touch input on the display in at least one of the first area or the second area; and
    activate the second sensor so as to detect an input having a pressure in a designated pressure range on the display in the second area.

12. The electronic device of claim 8, wherein the first input includes a drag input for moving the object from the first area to the second area.

13. The electronic device of claim 8, wherein the processor is further configured to:
    display a second object related to the application via the first area; and
    display the second object in the second area at least based on the first input.

14. The electronic device of claim 8, wherein the second area is disposed at one side of the first area.

15. The electronic device of claim 8, wherein the processor is further configured to:
    receive information related to a notification of the application;
    determine a size of a notification area in which the notification of the application is to be displayed at least based on the received information; and
    display the notification area in at least one of the first area or the second area of the display.

* * * * *